United States Patent [19]

Randol

[11] 4,007,813
[45] Feb. 15, 1977

[54] DRUM-TYPE SERVICE AND EMERGENCY BRAKE

[76] Inventor: Glenn Talley Randol, 3 E. 2nd Ave., Mountain Lake Park, Md. 21550

[22] Filed: Dec. 10, 1974

[21] Appl. No.: 531,242

[52] U.S. Cl. ............................. 188/76; 188/72.7; 188/106 F; 188/250 G
[51] Int. Cl.² .................................. F16D 53/00
[58] Field of Search .............. 188/76, 106 F, 136, 188/74, 106 A, 79.5 GE, 72.6, 72.7, 250 R, 250 G, 250 B; 192/73

[56] References Cited

UNITED STATES PATENTS

| | | | |
|---|---|---|---|
| 1,711,321 | 4/1929 | McNelles | 188/76 |
| 3,159,245 | 12/1964 | Dotto | 188/76 |
| 3,388,776 | 6/1968 | Burnett | 188/76 |
| 3,853,207 | 12/1974 | Rist | 188/76 |

Primary Examiner—Trygve M. Blix
Assistant Examiner—Edward R. Kazenske

[57] ABSTRACT

A drum-type brake adaptive to front and rear-axle constructions on motorized vehicular equipment, in which braking torques are developed by one or more radially-operating caliper units positioned around the circumference of an open brake drum co-rotatable with the vehicle road wheel. The caliper unit comprises an inner and an outer segmental brake shoe which carry detachable linings, respectively, in spaced confronting relationship that straddle-mount the drum's flange to apply braking forces to opposite faces, respectively, thereof, and reciprocative mechanism including a pair of interengaging push-pull members projecting from the brake shoes, respectively, and slidably installed along the radius of the drum's backing plate. A double-acting cam-lever operably incorporated in the mechanism between the pair of members to mechanically separate them thus drawing the pair of brake shoes toward each other into frictional braking engagement with the drum's flange to effect normal service braking under action of pressurized fluid against a piston mechanically-connected to operate the cam-lever, and installed in a horizontal wheel-cylinder tangentially-oriented integrally or separately with respect to the peripheral margin of the axle-bearing retainer (flange), and to effect emergency (parking) brake operations under manual force exerted on a control mechanically-connected to operate the cam-lever at will independently of or in cooperation with pressurized fluid actuation thereof. The brake shoes include a mechanism for facilitating lining replacement without dismantling or demounting the caliper unit.

12 Claims, 14 Drawing Figures

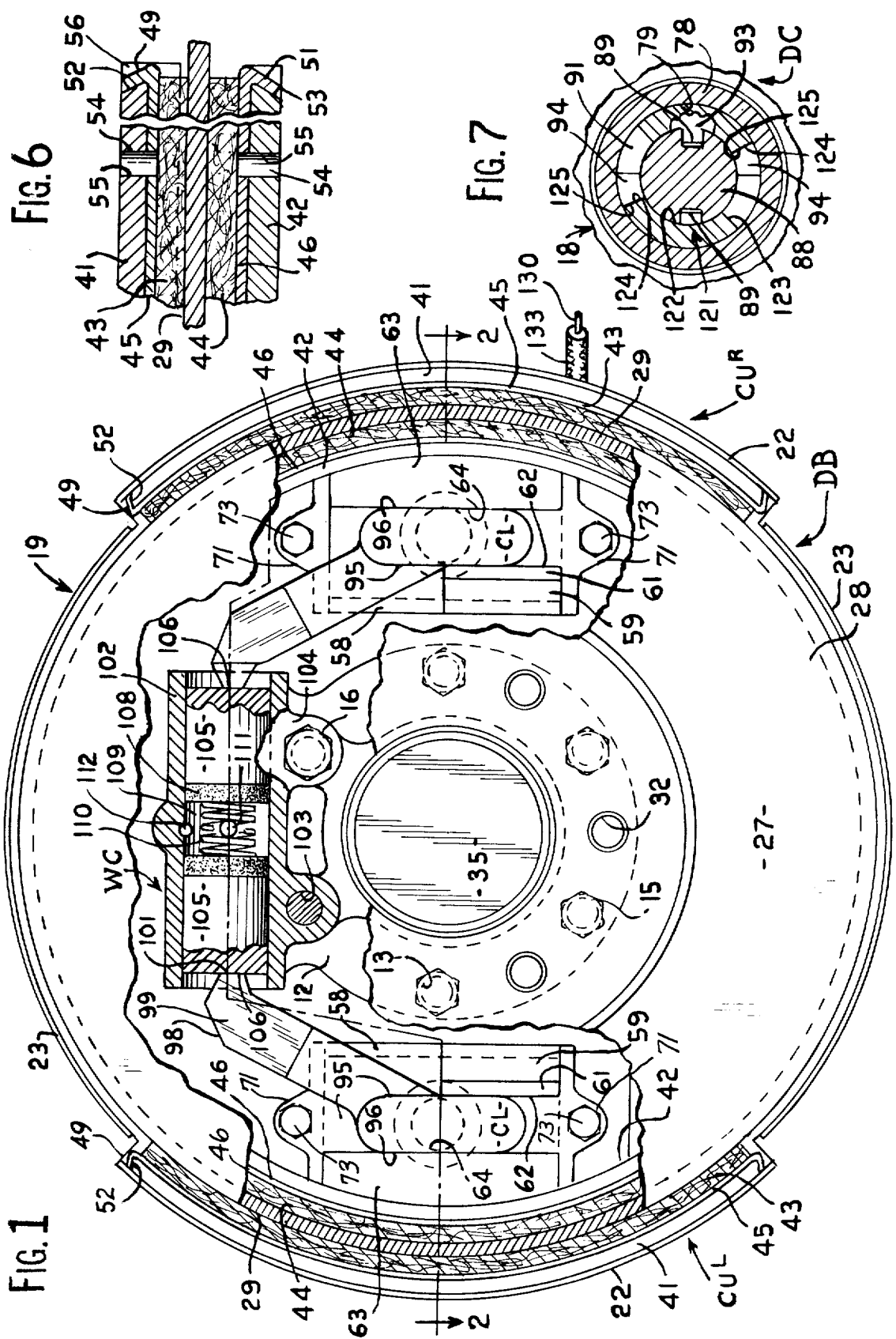

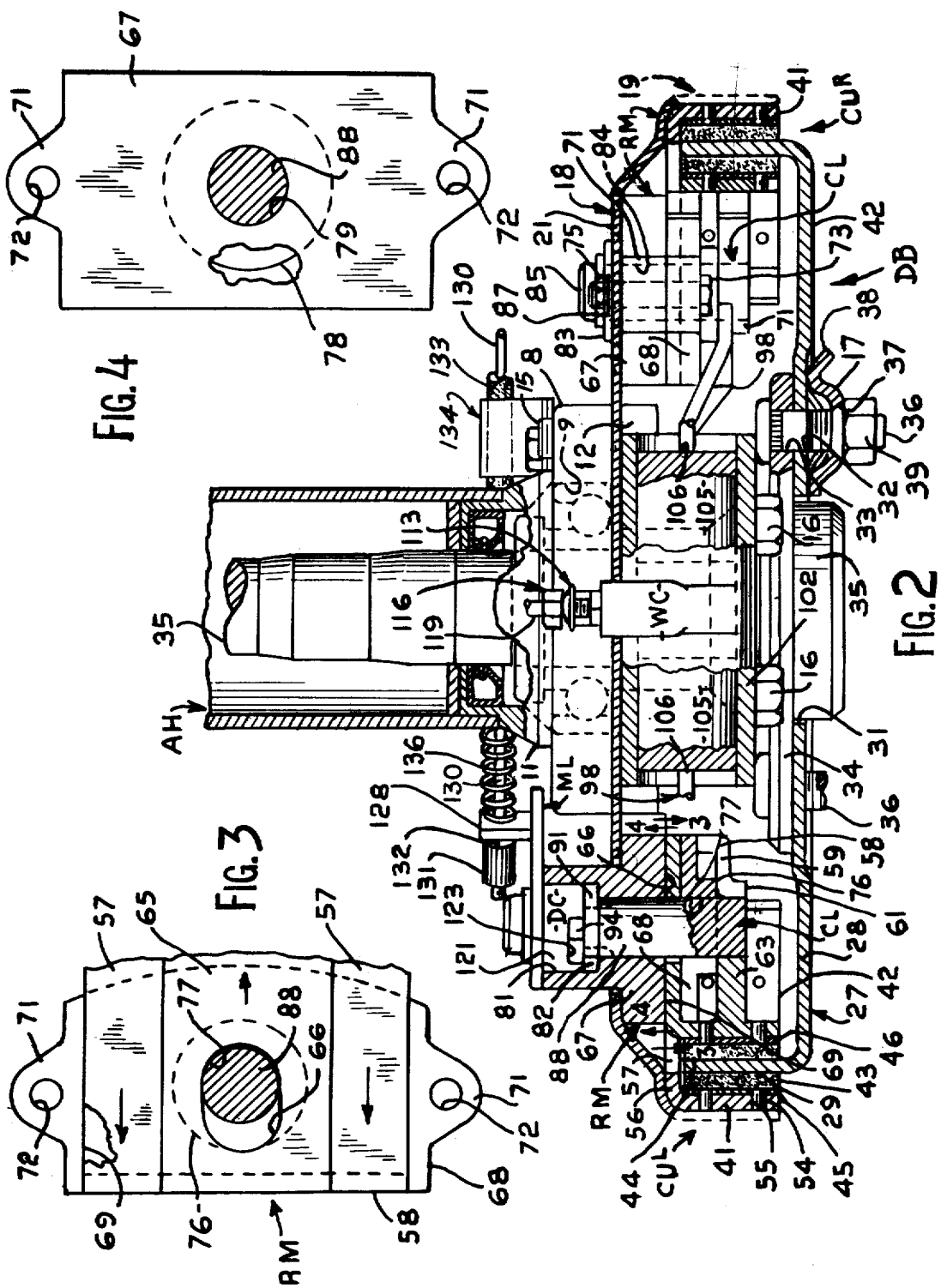

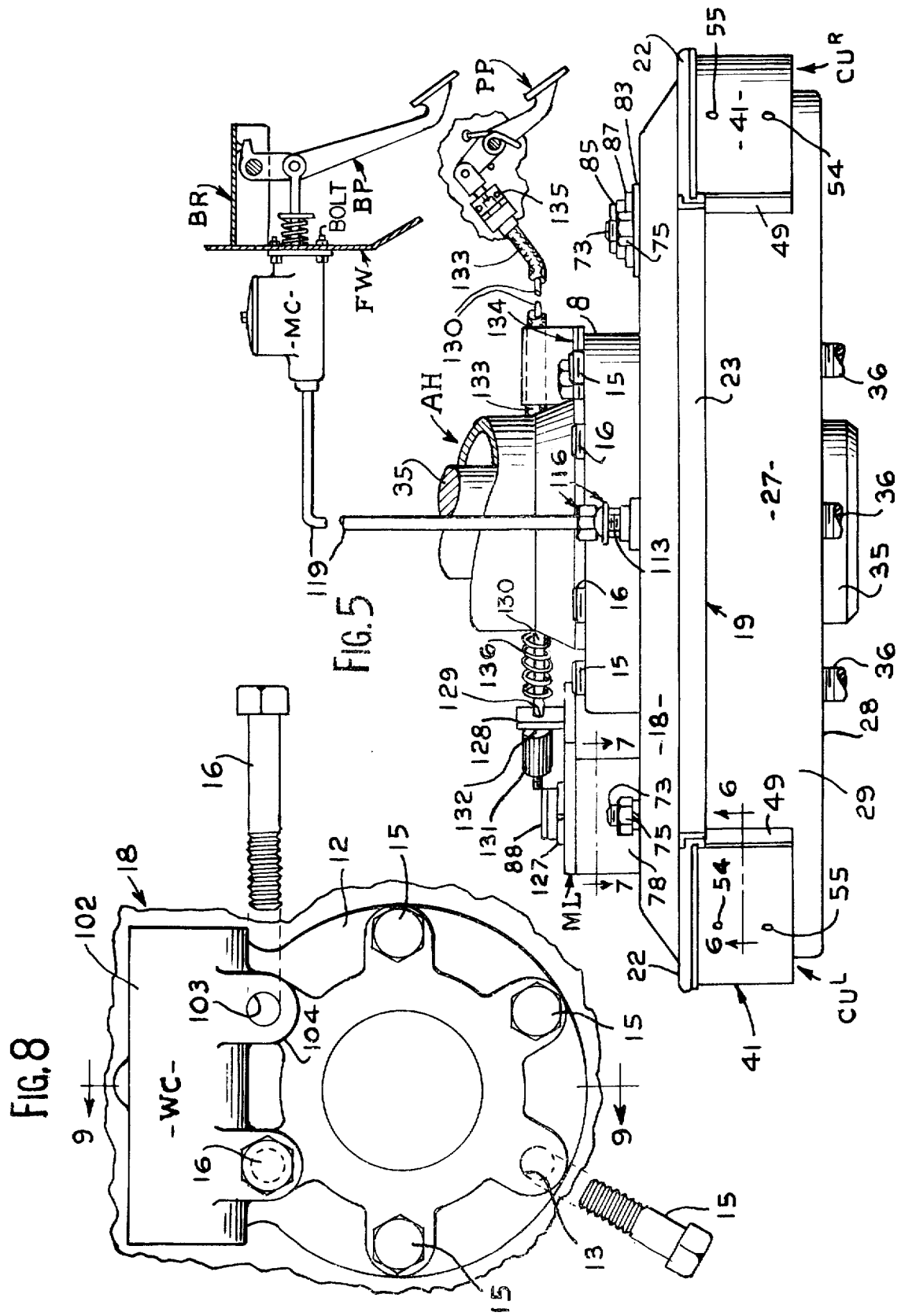

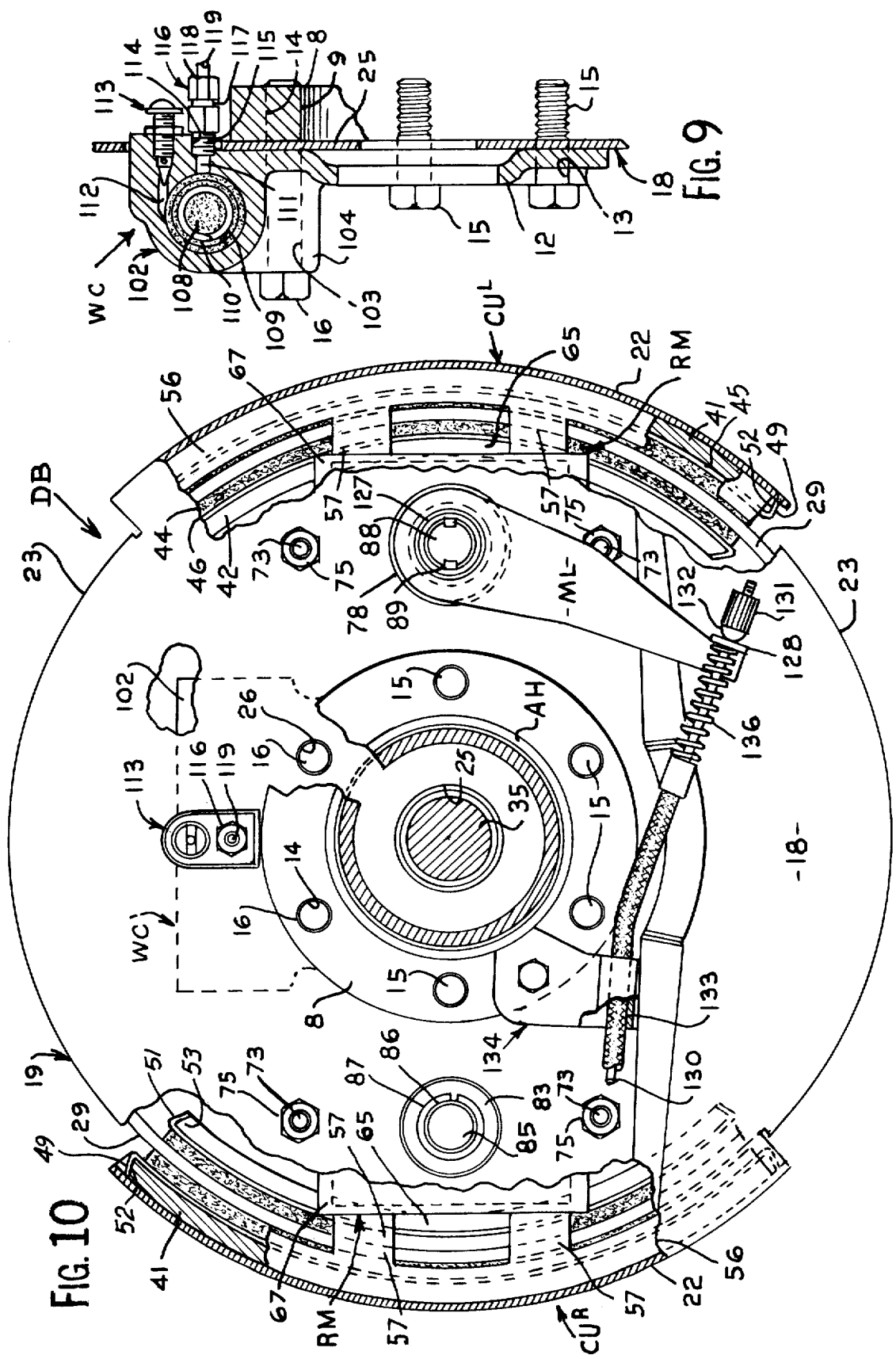

DRUM-TYPE SERVICE AND EMERGENCY BRAKE

This invention relates to brake systems for automotive vehicles and the like, and is more particularly concerned with a novel and improved open drum brake characterized by one or more caliper units circumferentically-spaced on the drum's backing plate, with each of said units having a pair of radial-operating sector-like shoes to frictionally clamp opposing sides, respectively of the drum's flange to brake the same.

The invention corresponds substantially to that disclosed in a proposed patent specification and illustrated by accompanying informal drawings, filed in the Patent Office Aug. 15, 1974 as a Disclosure Document under identifying number 034,624.

The primary objective of the invention is to provide a novel open drum brake having both service and emergency braking capabilities plus all the advantages which the disc brake gives, and wherein the brake drum is frictionally-controllable by a novel caliper system comprising one or more caliper units characterized by a pair of radial-operating shoes in each unit acting on opposite sides of the drum's flange under hydraulic pressure to provide service braking, and under manual control to effect emergency braking.

An object importantly relating to the primary objective, is the selective use of the number of caliper units for braking the brake drum whereby one or more units may be employed for service braking under a single wheel-cylinder which is horizontally-oriented tangentially as an integrated component with the axle bearing retainer; while emergency braking may involve all or a less number of units under manual control notwithstanding all of the units are hydraulically-operated to effect servicing braking.

A salient feature of the novel caliper system resides in the novel combination of a pair of diametrically-opposed caliper units controllable by hydraulic and/or manual forces, wherein hydraulic force is generated by a single wheel-cylinder normal to the caliper units and mounted as an integral component with the axle bearing retainer, or mounted separately on the backing plate.

Another feature of the present drum brake inhibits the heat generated under braking-action which causes the "thermal fade effect", from affecting the available coefficient of friction to any appreciable degree since distortion of the drum's flange is negligible due to the braking forces being applied with equal intensity to opposite sides of the drum's flange by opposing radially-operating brake shoes, and to the continuous cooling effect on the open drum in a similar manner to disc brakes.

Another feature of the invention is provided by radially-oriented caliper units characterized by a reciprocative mechanism having a pair of slidably-interfitting (interengaging) members connected to a pair of brake shoes, adapted to frictionally load opposite sides of the drum's flange under hydraulic and/or manual power, said mechanism being radially-installed on the drum's backing plate with its interfitting members characterized by relative sliding movement defining a "push-pull" action to achieve braking torque between the brake shoes and rotatably interposed drum flange co-rotational with the vehicle wheel.

Another salient feature of the present drum brake, is provided by novel integration of the axle-bearing retaining plate with a tangentially-oriented wheel-cylinder, including a second embodiment in which the wheel-cylinder is mounted on the backing plate separate from the retaining plate enabling the latter to assume its normal circular profile and is secured to the axle-housing flange by means of a plurality of cap screws.

Another feature is the utilization of a novel one-way drive connection between the cam-lever shaft and a manually-operated lever therefor whereby the latter is idle when pressurized fluid actuation of the cam-lever is effective to achieve adequate service braking.

Another advantage provided by the present drum brake enables the lining segments when excessively worn to be slipped out and new ones slipped into their respective brake shoes without dismantling or demounting the caliper unit and included brake shoes.

Another novel feature is the application of light spring force to draw the lined brake shoes into non-braking contact with the drum's flange when the brakes are released, which contributes one of the special advantages of the disc brake in eliminating moisture and wiping away other materials that might have a frictionreducing effect including automatic adjustments for lining wear to take up the slack in the caliper system.

An object relating to the feature described in the paragraph next preceding, is to utilize the wheel-cylinder piston cup spring with the precise deflection to produce the nonbraking force thus simplifying overall braking structure with resultant reduction in service requirements.

And, still another feature of the novel drum brake is the provision of a drum-type brake having operating advantages of disc brakes, which is readily adaptive to the front and rear-axle constructions currently employed on automotive vehicles or the like, and characterized by simplicity and ruggedness to provide all the performance and service advantages of disc brakes, with the added feature of built-in emergency (parking) brake capabilities which eliminate use of combined disc and drum brake units in the rear wheels, for example, for service and emergency braking.

A still further object is the provision of manufacturing advantages of permitting a wide range of braking torque requirements to be met with a minimum set of parts by changing the drum and backing plate diameters, or by increasing or decreasing the number of caliper units used on a given size drum and thereby "custom-fitting" braking torque to the weight and load capacity of the vehicle.

And a further novel and important feature of the present drum brake, enables easy and economical replacement of the conventional shoe-to-drum brake and wheel-cylinder assembly, thus making the present drum brake especially suited for aftermarketing, such adaptation being made feasible by utilizing the drum and backing plate of conventional drum brakes as the means for enclosing and supporting the working components of the present drum brake.

Features and advantages not specifically set forth above will become apparent to persons skilled in the related art from the following comprehensive description considered with the accompanying drawings wherein:

FIG. 1 is an outboard elevation partly in section with portions broken away of a right drum-type brake assembly embodying the principles of the present invention, said assembly being shown in brake-released disposition and characterized by a pair of diametricallyopposed caliper units hydraulically and/or manually-operated for service and/or emergency (parking) brake operations, respectively;

FIG. 2 is a transverse section taken along the line 2—2 of FIG. 1 showing the outer and inner brake shoes and included reciprocative mechanism characterized by push-pull action to operate the brake shoes into braking engagement with the drum's flange;

FIG. 3 is a transverse section taken on an enlarged scale along the line 3—3 of FIG. 2 showing the cover plate and interengaging slidable members (plates) carried thereby of the reciprocative mechanism;

FIG. 4 is a transverse section taken on the same scale as FIG. 3 along the line 4—4 of FIG. 2 showing the support member (plate) of the reciprocative mechanism contiguously mounted on the backing plate;

FIG. 5 is a plan view of FIG. 1 showing the hydraulic and linkage connections between the service brake pedal and parking brake pedal pivotally mounted in the driver's compartment of the vehicle, and the wheel-cylinder and cam-lever, respectively;

FIG. 6 is a transverse section taken on an enlarged scale along the line 6—6 of FIG. 5 with the parts in planar relation to show the ends of the outer and inner brake shoes and method of connecting their related linings thereto, and a fragmentary portion of the operably interposed drum flange;

FIG. 7 is a transverse section taken on an enlarged scale along the line 7—7 of FIG. 2 showing the one-way mechanical connection between the cam-lever operating shaft and outer manually-operated lever connected to the parking brake pedal;

FIG. 8 is an end elevation of the combined axle shaft bearing retainer plate and wheel-cylinder housing (body);

FIG. 9 is a transverse section taken along the line 9—9 of FIG. 8 showing one of the wheel-cylinder piston cups and spring therefor and included bleeder-valve and hydraulic connection between the wheel-cylinder control chamber and brake line leading to the master brake cylinder as shown in FIG. 5;

FIG. 10 is an inboard elevation of the drum brake assembly shown in FIG. 1, to clarify structural details of the cable hook-up between the emergency brake input lever and parking brake pedal as shown in FIG. 5;

Figure 13:
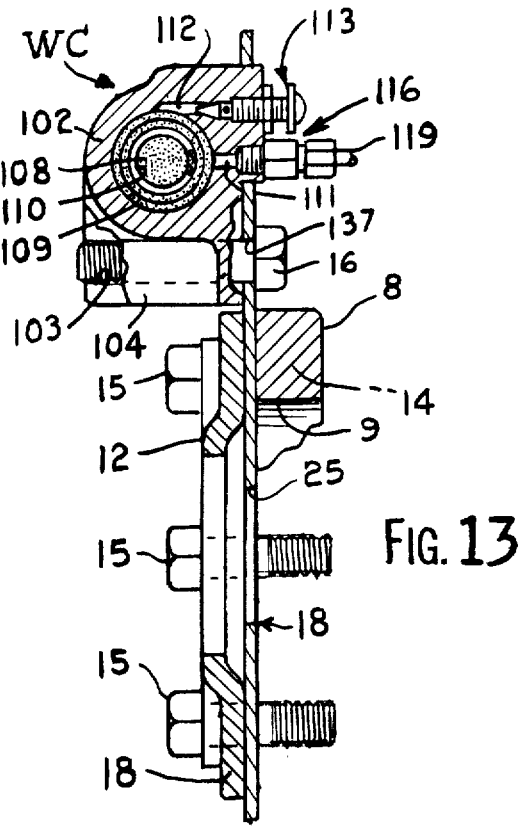
Figure 14:
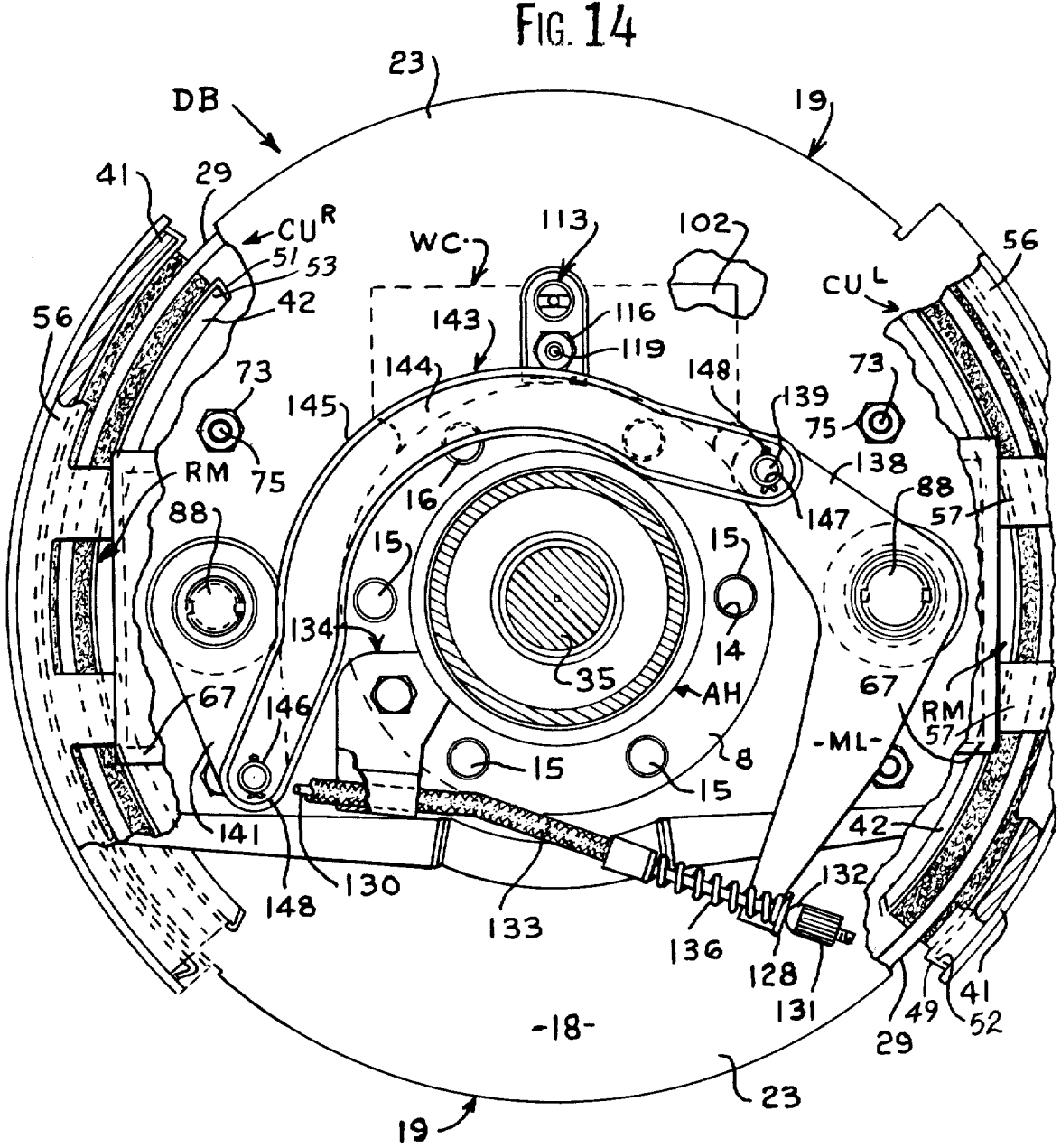

FIG. 13 illustrates another modification of FIG. 9 in which the wheel-cylinder housing is mounted on the backing plate separate from the bearing retaining plate which is restored to full circular profile to retain the axle bearing in conventional manner; and FIG. 14 is a view similar to FIG. 10 but incorporating a modified linkage wherein the two caliper units are mechanically-linked to effect emergency braking in cooperation with or independently of pressureized fluid actuation of said units to effect service braking.

Referring now to the drawings, wherein like reference characters designated similar or corresponding parts and assemblies thereof throughout the several views (figures), there is shown in FIG. 1 my novel and improved open drum brake generally designated DB, exemplarily installed on a motor vehicle represented by a fragmentary portion of its right rear axle housing AH which is circularly flanged at its outer end 8, and provided with a circular recess 9 for reception of an axle-supporting ball or roller bearing 11 under a retaining plate 12 having a plurality of circumferentially-spaced holes 13 which are peripherally-oriented in a pattern similar to a like-number of tapped holes 14 in the flanged end 8 of the axle housing AH, for reception of a like-number of threaded, fasteners (cap screws), preferably six in number, and comprising four short screws 15 and two long screws 16. The right rear wheel of the vehicle is represented by a fragmentary portion 17 of the wheel disc (see FIG. 2). A stationary cup-shaped member (backing plate) 18 is formed with a segmental flange 19 normal to its bottom wall 21, the latter flange being formed with a pair of diametrically-opposed vertical flanges 22, and a pair of diametrically-opposed horizontal flanges 23 (see FIGS. 2 and 5). The central portion of the backing plate 18 is provided with a circular opening 25 having a plurality of holes 26 in its peripheral margin in a matching pattern to the holes 13 and 14, whereby the central portion of the backing plate 18 and the retaining plate 12 are impinged under cap screws 15, 16 fast on said housing flange 8. The flanges 22, 23 serve the additional purpose of adding stiffness to the backing plate 18 as is understood.

A cup-shaped open drum 27 is formed with an integral bottom wall 28 having a peripheral flange 29 normal thereto. A central circular opening 31 defines the center portion of the bottom wall 28, and the marginal portion of said opening is provided with a plurality of circumferentially-spaced holes 32. A matching pattern of holes 33 is formed in the peripheral margin of a flange 34 integral with the axle shaft 35 journaled by the bearing 11 on the axle-supporting housing AH. A like-number of headed lug-bolts 36 is pressfitted through the holes 33 or otherwise stabilized therein, and extends through the holes 32 and thence through holes 37 in the peripheral margin of a circular opening 38 defining the central portion of the wheel disc 17 as shown in FIG. 2, whereby the latter, and the brake drum 27, axle flange and shaft 34, 35, respectively, form a co-rotational assembly under capturing lug-nuts 39 threaded snugly onto the lug-bolts 36.

The backing plate 18 and drum 27 cooperate to produce a protective enclosure for one or more caliper units, preferably two horizontally-oriented units in diametrical opposition with the unit on the left, as viewed in FIGS. 1 and 2, being designated "$CU^L$", and the unit on the right designated "$CU^R$" and mounted on the backing plate 18 in a manner to be described hereinafter. The vertical flanges 22 which define a portion of the periphery of the backing plate, are adapted to overlie outer portions of the two caliper units, demonstrated in FIG. 2, or these flanges may be extended to the full width of such caliper portions as demonstrated by dashed lines in FIG. 2 and solid lines in FIG. 5, while the horizontal flanges 23 on the backing plate only partially overlie confronting portions of the drum's flange 29, but may also be extended as demonstrated by dashed lines of flanges 22 in FIG. 2, to the full width of the drum's flange 29.

The caliper units $CU^L$ and $CU^R$ as shown in FIGS. 1, 2 and 10, each comprises structure defining an outer and an inner brake pad (shoe) 41, 42, respectively, in circular ring sector profile (see FIGS. 1, 5 and 10), each of said shoes carries similarly formed linings 43, 44, respectively, bonded or otherwise secured to metallic strips 45, 46, respectively, made from springy material with their opposite ends defining angulated upturned flanges 49, and downturned flanges 51, respectively, adapted to cooperate with similarly formed ends 52, 53 on said shoes 41, 42, respectively, to stabilize their respective linings against relative endwise movement. A plurality of stabilizing pins 54 fast at one end in holes 55 formed in the backing strips 45, 46, is adapted to provide stabilization of the attached linings against both lateral and endwise relative movement in cooperation with the endwise stabilizing effect of the end flanges 49, 51 in engagement with the angulated shoe ends.

When the linings 43, 44 become excessively worn, replacement is readily effected by first releasing the end flanges 49, 51 as by springing them substantially normal to their respective strips proper, and then pulling the strip-backed lining from its corresponding shoe until the pins 54 clear their respective holes 55 in the shoes.

Upon removing the worn lining, the new lining is attached to its corresponding shoe by inserting the pins 54 on the backing strip into the holes 55 followed by springing the flanges 49, 51 outwardly until they clear their respective angulated ends of the shoe for the flanges to snugly snap into locking position best shown in FIGS. 1 and 6.

Figure 11:
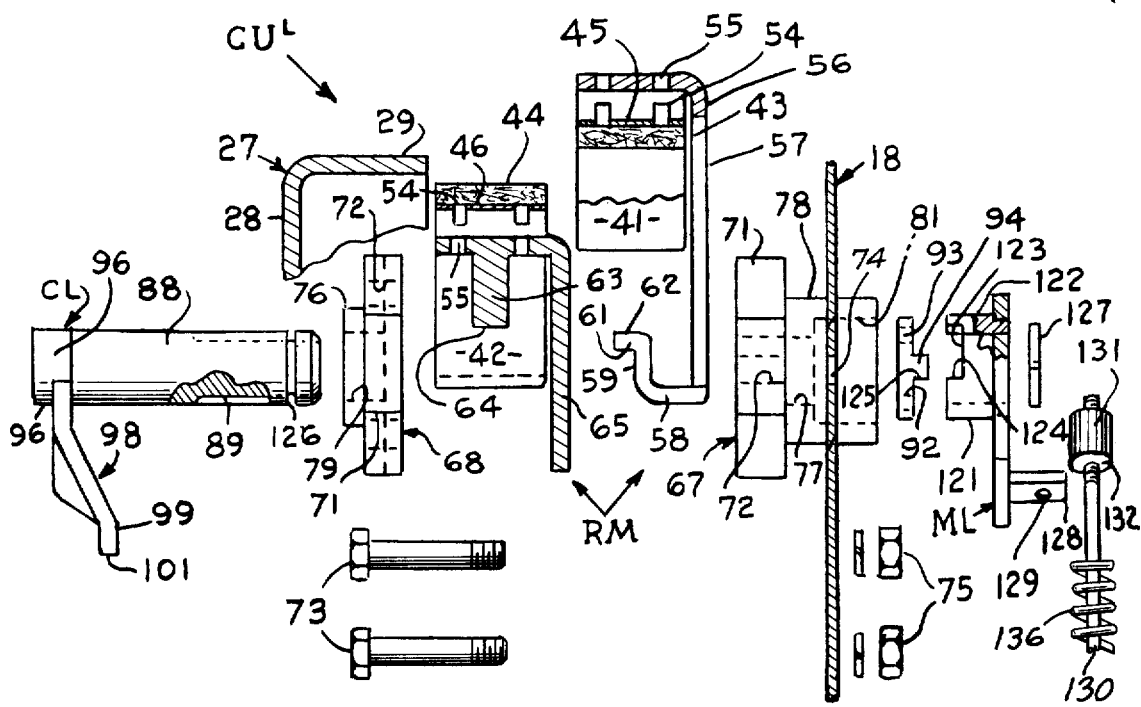
FIG. 11 is an exploded view of the parts comprising the lefthand caliper unit as viewed in FIGS. 1 and 2.

The outer shoe 41 comprises structure defining a downturned flange 56 coextensive therewith, a pair of spaced centrally-disposed depending members (plates) 57 extending from the flange 56 and interconnected at their lower ends by a horizontally-disposed flange 58 integral therewith and terminating in an upturned flange 59 substantially half the length of the horizontal flange with the upper end of the former flange terminating in a horizontal flange 61 defining a working surface (face) 62 on its upper side (see FIGS. 1, 2 and 11).

The inner shoe 42 comprises structure defining a horizontal tangentially-oriented flange (rib) 63 having a working surface (face) 64 centrally-disposed longitudinally on the underside of the last-defined shoe and integrated therewith, and integrally extending from the latter shoe proper is a laterally-disposed elongated member (plate) 65 having a centrally-disposed elongated shaft-clearing opening 66 best shown in FIGS. 2 and 3. The plate 65 slidably interfits the space between the plates 57 (see FIGS. 3 and 10) to produce what may be termed a "reciprocative mechanism" generally designated RM best shown in FIGS. 3 and 11), and characterized by push-pull action for drawing the brake shoes 41, 42 toward each other into frictional clamping relation with respect to the drum's flange 29 to brake the same, and effective to separate the shoes 41, 42 to release such braking action to take the vehicle brakes off as is understood. As will be observed in FIGS. 1 and 2, the brake shoes 41, 42 and linings carried thereby are adapted to straddle-mount the drum's flange 29 so that when the brake shoes 41, 42 are drawn toward each other to apply the vehicle brakes, equal pressures are applied to opposite sides of the drum's flange 29 resulting in minimal distortion of the latter when subjected to abnormal heat generated by the frictional pressure of the brake shoe linings, and thereby eliminating thermal fade effect so that the available coefficient of friction may be utilized for braking.

The reciprocative mechanism aforesaid includes additional structure defining a generally rectangular support (base) member (plate) 67 (see FIG. 4) mounted on the backing plate 18 as shown in FIGS. 2 and 10, and a similarly profiled cover member (plate) 68 (see FIG. 3). The latter plate in assembled juxtaposed relation with respect to the support plate 67 produces a channel (track) 69 therebetween in rectangular cross section and is adapted to slidably receive the interfitting plates 57, 65 as shown in FIGS. 2 and 3. Opposite ends of both plates are provided with integral projections (ears) 71 in preferably triangular configuration at opposite ends thereof, said ears having aligned bolt holes 72 for reception of elongated headed bolts 73 (see FIGS. 1 and 8) which pass through holes 74 in the backing plate 18 (see FIGS. 2, 5 and 11) to mount the support and cover plates 67, 68, respectively, and included interfitting plates 57, 65 constituting a portion of the reciprocative mechanism RM, in operative position on said backing plate to control the brake shoes 41, 42 as shown. Capturing nuts 75 threaded onto the threaded portions of the bolts 73 projecting to the exterior of said backing plate, secure the assembled reciprocative mechanism RM and included brake shoes 41, 42 in their respective operating positions best shown in FIGS. 1, 2 and 10.

As shown in FIGS. 1 and 2, each of the cover plates 68 is provided with a centrally-disposed lateral boss 76, and a bore 77 coextensive with said boss 76 and the plate proper (see FIGS. 3 and 11). The lefthand support plate 67 is provided with an elongated centrally-disposed lateral boss 78, and a bore 79 in coaxial relation to the bore 77 in the mating cover plate 68 passes through the plate proper and a portion of the boss 78. The bore 79 terminates in a counterbore 81 defining an internal annular shoulder 82 therebetween. The righthand support plate 67 is provided with a centrally-disposed lateral boss 83 shorter than the boss 78, and a bore 84 extends through the latter plate and boss in coaxial relationship with respect to the bore 77 in the mating cover plate 68.

A support shaft 85 is journaled in the coaxial bores 77, 84. The inner end of said shaft integrally carries a double-acting cam-lever generally designated CL best shown in FIGS. 1 and 11, and the outer end of said shaft is provided with an annular groove 86 flush with the outer end of said boss 83. This groove receives a split metallic retaining ring 87 whereby the cam-lever CL is axially stabilized against the confronting end of the boss 76 in its rotative working position.

A manual input shaft 88 is journaled in the coaxial bores 77, 79 and freely extends through the opening 66 in the inner shoe support plate 65 between said bores of the corresponding reciprocative mechanism RM (see FIG. 3). The length of the opening 66 accommodates the full unrestricted reciprocative movement of the plate 65 relative to the plates 57 connected to the outer brake shoe 41 to achieve braking action on the drum's flange 29. The inner end of the shaft 88 is similarly provided with an integral cam-lever CL. The outer end portion of the shaft 88 in substantially circular alignment with the counterbore 81, is provided with a pair of diametrically-opposed longitudinal grooves 89 (see FIGS. 2, 7 and 11). An annular torque-transmitting drive disc (plate) 91 has a circular aperture 92 interrupted by a pair of diametrically-opposed splines 93 in confronting relation, and through which the shaft 88 passes with the splines engaging the grooves 89 to lock the drive plate 91 to the last-defined shaft for co-rotation wherein the latter is contiguous to the shoulder 82 (see FIG. 2). A pair of diametrically-opposed lugs 94 projects laterally from the peripheral margin of the drive plate 91 best shown in FIGS. 7 and 11.

Opposite sides of the last-mentioned cam-lever CL define camming surfaces 95, 96, respectively, which have operative interposition with respect to the working faces 62, 64 carried by the brake shoes 41, 42, respectively, whereby clockwise rotation of the cam-lever CL in the righthand caliper unit $CU^L$ as viewed in FIG. 10 is effective to separate the working faces 62, 64 carried by the interfitting shoe plates 57, 65, and thereby drawing the lined shoes 41, 42 toward each other into frictional clamping relation on the drum's flange 29 to brake the same. The lefthand caliper unit $CU^R$ as viewed in FIG. 10, is similarly operated to brake the drum's flange 29 in response to counterclockwise rotation of the support shaft 85 and integrated cam-lever CL.

Integrally projecting at an angle from each of the cam-levers CL, is an elongated arm 98 as shown in FIG. 2, each of the arms is inwardly offset at two points to provide a terminal free end portion 99 having a working edge 101 normal to the axis of the related cam-lever CL therefore normal to the axes of the shafts 85, 88 best shown in FIGS. 1 and 2.

Referring now to FIGS. 1, 8 and 9 there are disclosed energizable operating means or power device in the form of a wheel-cylinder generally designated WC comprising structure defining an axially-bored body (housing) 102 which is preferably integrated with the axle bearing retaining plate 12 aforesaid; however, the invention contemplates that the wheel-cylinder housing and retaining plate may be separate components but tangentially-oriented as best shown in FIG. 8. Whether or not these two components produce a integrated assembly or separate assemblies, the two upper cap screws 16 have sufficient length to pass through elongated holes 103 in two embossments 104 integral with the lower side of the housing 102, into threaded engagement with the aligned tapped holes 14 in the flanged end 8 of the axle-housing AH. The remaining four shorter cap screws 15 would therefore pass through the holes 13 in the retaining plate proper as is understood, to thread into the tapped holes 14 in alignment therewith.

Accordingly, the cap screws 15, 16 are effective to mount the wheel-cylinder housing 102 and the bearing retaining plate 12, fast on the axle-housing flange 8, and to impinge the central portion of the backing plate 18 against the flange 8 to provide a support for the two caliper units $CU^L$ and $CU^R$ and their respective reciprocative mechanisms RM.

The bore of the wheel-cylinder housing 102 is adapted to receive a pair of spaced opposing pistons 105 with their respective outer ends defining a central working land 106 adapted to act on the terminal arm portions 99 with their respective working edges 101 engaging said lands to rotate the arms 98 and integrated cam-levers CL in opposite directions, in response to operative energization of said pistons, to apply the vehicle service brakes as is understood. Each of the pistons 105 is provided with an annular lip-type cup 108 formed of molded rubber, and the space normally obtaining between the piston cups defines a control pressure control126 chamber 109. A normally compressed spring 110 is operatively disposed in said control chamber to continuously react on the piston cups and thus urge the pistons apart. A pressure input passage 111 continuously communicates with the control chamber 109 and an air-exhaust passage 112 continuously communicating with the control chamber 109, is opened and closed by a commercial needle-type bleeder-valve 113 shown best in FIG. 9, to release any air trapped in the brake system and included control chamber 109 when changing fluid, requiring that the brake lines and control chamber 109 be free of air pockets to recharge the system solid as is understood.

As shown best in FIG. 9, the outer end of the input passage 111 terminates in a tapped counterbore 114 which receives the threaded shank 115 of a commercial hydraulic fitting 116, the latter having a tapped bore continuously communicating with the threaded shank 117 of a hex-bushing 118 adapted to connect the flared end of a brake line 119 fluid-tight. The other end of the brake line 119 is similarly connected to the pressure working chamber (not shown) of a commercial master brake cylinder MC mounted on the engine-side of the vehicle firewall FW and operated by a brake pedal BP pivotally suspended from a bracket BR mounted on the driver's side of the firewall whereby operation of the pedal BP clockwise as viewed in FIG. 5, is effective to pressurize the fluid in the master cylinder working chamber and connected brake line 119 and control chamber 109, to force the pistons 105 apart with resultant clockwise rotation of the cam-lever CL on the right as viewed in FIG. 10, and the cam-lever CL on the left counterclockwise, which forces the brake shoes 41, 42 toward each other into frictional clamping relation with opposite sides of the drum's flange 29 to brake the latter and associated vehicle wheel.

A manually-operated lever ML for the caliper unit $CU^L$ and included cam-lever CL as viewed in FIGS. 2 and 5, is provided with a laterally extending hub 121 formed at its outer end with an annular shoulder defining a reduced diameter portion which receives the hub end of the lever and made fast thereon as by welding or otherwise. The hub 121 is provided with a coextensive bore 122 to receive the shaft 88. The inner end of the hub 121 is formed with a pair of diametrically-opposed slots 123 having working ends (shoulders) 124 radially-oriented and adapted to engage confronting sides (faces) 125 on the lugs 94 integral with the drive plate 91 to produce what may be termed a "one-way drive connection" designated DC between the lever hub 121 and shaft 88 to rotate the corresponding cam-lever CL to actuate the related reciprocative mechanism RM effective to draw the brake shoes 41, 42 toward each other into frictional clamping engagement with opposite sides, respectively, of the drum's flange 29 thus achieving service braking of the latter and connected vehicle wheel under pressurized fluid in the wheel cylinder WC or, in the case of need for emergency (parking) brake operations, driver operation of a spring-loaded parking brake pedal PP pivotally suspended in the driver's compartment of the vehicle as shown in FIG. 5, rotates the lever ML clockwise as viewed in FIG. 10 to transmit torque via the one-way drive connection DC to the corresponding cam-lever CL to actuate the related reciprocative mechanism RM to draw the brake shoes 41, 42 toward each other into frictional clamping engagement with opposite sides, respectively, of the drum's flange 29 to achieve such emergency braking independently of or in cooperation with pressurized fluid actuation of the same reciprocative mechanism RM.

As shown in FIG. 5, clockwise rotation of the cam-lever CL at the left is effective for service braking under the energized wheel cylinder WC upon activating the master brake cylinder MC under manual force applied to the brake pedal BP and, in the case of emergency braking, like-rotation of the lefthand cam-lever CL by manual force applied to the pedal PP which is mechanically-linked to the free end of the manual lever ML mounted exteriorly of the backing plate 18, would apply the brake shoes 41, 42 to brake the drum 27 and connected vehicle wheel.

It is thus seen that when the wheel-cylinder WC is operatively energized to effect service braking, the lever ML is idle due to the radial slots 123 in the end of the lever hub 121 accommodating such idle (lost-motion) movement of the lugs 94 on the drive plate 91, but when the lever ML is operated in a clockwise direction as viewed from FIG. 10, the working ends (shoulders) 124 of the slots 123 engage the confronting sides (faces) 125 on the lugs 94 to rotate the cam-lever CL correspondingly to apply the vehicle emergency brakes independently of or in cooperation with pressurized fluid actuation of the service braking operation.

The outer end portion of the shaft 88 is provided with an annular groove 126 flush with the reduced end of the hub 121, which receives a split metallic retaining ring 127 whereby the cam-lever CL, shaft 88, drive plate 91. and lever ML are axially-stabilized in their respective operating positions and included slotted hub 121, with the related cam-lever CL in working abutment with the cover boss 76, and the marginal portion of the lever hub end in working abutment with the confronting end of the boss 78 best demonstrated by FIG. 2.

Referring again to the wheel-cylinder spring 110 operably disposed in the hydraulic control chamber 109 between the piston cups 108 to maintain the latter in follow-up contact with confronting ends of the pistons 105 and also continuously urging the latter apart, it is important to note that this spring has an additional and important function of maintaining a light nonbraking contact between the braking flange 29 and shoe linings when the vehicle brakes are in released condition. This light contact tends to eliminate moisture and wipe away any materials that might have a friction-reducing effect. This nonbraking contact also provides automatic wear adjustments for the shoe linings as they wear thinner as well as a take-up in the mechanical connections in the overall brake structure operated by the wheel-cylinder WC, which contributes a more sensitive initial frictional contact of the brake shoe linings 43, 44 with opposing braking surfaces, respectively, on the drum's flange 29 whereby minimal servicing is required through the service life of the brake linings 43, 44. These benefits are achieved in the present drum brake system by installing the spring 110 with the precise compressive deflection to maintain such light nonbraking contact when the brake shoes are released for the vehicle service brakes to be off.

The free end of the lever ML is provided with a lateral outturned flange 128 having a central hole 129 through which a portion of a flexible link (cable) 130 passes to receive an axially-adjustable collar (sleeve) 131 having a dome-shaped end 132 in continuous engagement with the backside of the flange 128 (see FIG. 10) under clockwise movement of the parking brake pedal PP (see FIG. 5), whereby said cable when pulled causes clockwise rotation of the manual input lever ML as seen from the latter figure. The cable 130 passes through a flexible sheath 133 suitably anchored at one end near the lever ML by means of a folded bracket (clip) 134 secured by a cap screw as shown threaded into a tapped hole in the axle housing flange 8, and the other end of the sheath 133 is anchored to a fixed portion of the vehicle in the driver's compartment by means of a bracket 135 attached by two machine screws as shown in FIG. 5, and thereby enabling the cable 130 to impart clockwise rotation to the lever ML as shown in FIG. 10 to effect emergency braking. A normally compressed spring 136 encircles that portion of the cable 130 spanning the space normally obtaining between the flange 128 and confronting end of the sheath 133, to maintain the dome-shaped end 132 of the adjustable sleeve 131 in engagement with the backside of the flange 128, said spring also accommodating axial adjustment of the sleeve 128 to take up lost-motion in the emergency brake linkage and particularly between the pair of shoulders 124, 125 (see FIG. 7) as automatic advancing of the lugs 94 occurs under automatic adjustment by the wheel-cylinder spring 110 to compensate for lining wear. Stated differently, the wheel-cylinder pistons 105 under spring 110 are constantly urged apart to avoid introduction of lost-motion in the service brake linkage; however, as the shoe linings wear therefore take up a new position, the pistons 105 take up a corresponding new position under influence of the spring 110, meaning that wheel-cylinder wear adjustment must occur before it becomes necessary to manually adjust the sleeve 131 to bring the working shoulders 124, 125 into engagement which removes from the emergency brake linkage any lost-motion so that hydraulic and manual application of the vehicle brakes is synchronized with initiation of hydraulic or manual force to achieve service or emergency braking.

MODIFIED EMBODIMENTS

Figure 12:
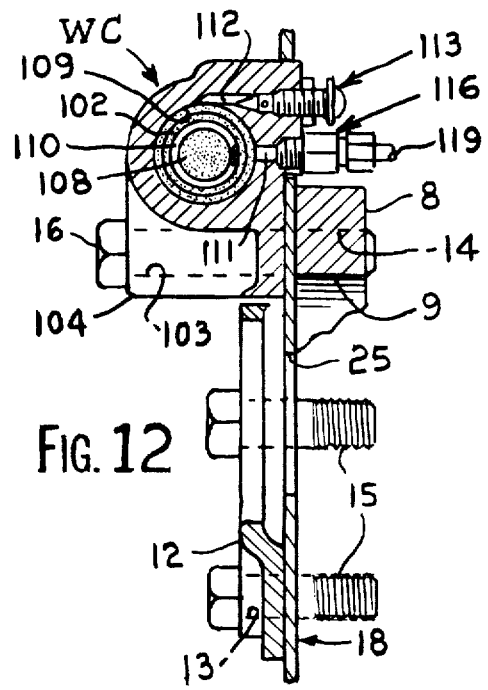
FIG. 12 illustrates a modification of FIG. 9 in which the wheelcylinder housing and retaining plate for the axle-shaft bearing, are separate components mounted on the axle-housing flange, respectively.

FIG. 12 illustrates a modification of the invention in which the single casting for the wheel cylinder housing 102 and the bearing retainer 12, is eliminated in favor of separate castings for these two components so that the wheel-cylinder WC may be inspected and serviced as needed independently of the axle shaft bearing 11. In the case of the wheel cylinder having to be replaced, the portion of the bearing retainer under the four short cap screws 15 would not have to be removed since the wheel cylinder housing 102 is detachable from its mounting by removing the two long cap screws 16.

FIG. 13 illustrates another modification of the invention in which the wheel-cylinder WC is mounted directly on the backing plate 18 separately from the bearing retainer 12, by means of the two long cap screws 16 inserted through holes 137 in the backing plate 18 into threaded engagement with the now tapped holes 103 in the two spaced embossments 104 integral with the underside of the wheel-cylinder housing 102. This modification restores the bearing retainer 12 to its full circular profile which is installed under six short cap screws 15 as is understood. Inspection and servicing this modified structure is carried out in traditional manner as in the case of commercial shoe-to-drum brake assemblies.

FIG. 14 illustrates a still further modification of the invention in which both caliper units $CU^{L-R}$ are mechanically-linked to operate their respective cam-levers CL in unison to effect emergency braking, and wherein both units incorporate the mechanical one-way drive DC. The manually-operated lever ML is provided with an angularly upstanding arm 138 with its free end provided with a laterally-extending pin 139. A lever 141 of the same length as the arm 138, is fast on the shouldered end of the hub 121 of the one-way drive DC in the corresponding caliper unit $CU_R$. A similar lateral pin 142 is provided on the free end of the latter lever. An elongated link 143 having an intermediate curving offset 144 to clear the axle-housing AH, is formed as a stamping defined by a perimetrical flange 145 for stiffness to increase its tensile strength, and holes 146, 147 through opposite ends of the stamping receive the pins 139, 142, respectively, to connect the arm 138 and lever 141 to have co-rotational movement whereby clockwise rotation of the manual lever ML under the parking brake pedal PP, is effective to rotate the lever 141 counterclockwise thus imparting corresponding rotative movements to the cam-levers CL in the two caliper units $CU_{L-R}$ via their respective one-day drive connections DC to apply the brake shoes 41, 42 of each unit to frictionally brake the drum 27 in emergencies or for parking the vehicle, in cooperation with or independently of wheel-cylinder actuation of the two caliper units to effect service braking of the brake drum 27. Cotter pins 148 through holes in the outer ends of the pins 139, 142 maintain the link 143 connected to the arm 138 and lever 141 as is understood.

OPERATIONAL SUMMARY

The foregoing structural disclosure and included functional description of the interacting part, are believed to clearly describe the invention and its mode of operation; however, in the interest of further clarifications the following summary is provided:

As demonstrated in FIGS. 1, 2, 3 and 4, braking torques are developed by one or more radially-operating caliper units $CU^{L-R}$ installed around the circumference of the open brake drum 27 and operatively mounted on the facing (outboard) side of the backing plate 18 which is suitably contoured for maximum stiffness as shown in FIG. 10. The reciprocative mechanism RM operably embodied in each of the caliper units, is made fast on the backing plate 18 by means of the two bolts 73 (see FIGS. 5, 10 and 11).

The outer and the inner brake shoe 41, 42, respectively, of each caliper unit are characterized by radial-sliding movement relative to each other induced by relative reciprocative (sliding) movement of the shoe support plates 57, 65, respectively, constituting said reciprocative mechanism RM. The detachable linings 43, 44 on the bonded backing strips 45, 46, respectively, straddle-mount the drum's flange 29 (see FIG. 2) whereby the confronting working (friction) faces on said linings are drawn into frictional clamping engagement with opposite sides, respectively, of the drum's flange 29 to brake the same as a function of pressurized fluid generated in the master brake cylinder MC acting in the wheel-cylinder control chamber 109 via the brake line 119 to operate the pair of pistons 105 apart. Such separation of the pistons 105 being effective to rotate the cam-lever arms 96 in opposite directions causing the camming surfaces 94, 95 on the cam-lever CL to act on the working faces 62, 64 respectively, carried by the shoe support plates 57, 65 integrally connected to the brake shoes 41, 42, respectively, which forces the outer and inner shoes 41, 42 toward each other with resultant clamping of the drum's flange 29 between the linings 43, 44 to achieve service braking action on the drum's flange 29 and associated vehicle wheel as is understood.

In the event emergency (parking) brake operations are required, such are effected by depressing the parking brake pedal PP shown in FIG. 5 which pulls the cable 130 to rotate the manual lever ML clockwise as viewed in FIG. 10 causing the input shaft 88 and related cam-lever CL to rotate in the same direction in unison with the lever ML. This movement of the lever ML causes the working faces 95, 96 on the cam-lever CL to act on the working face 62 carried by the horizontal flange 58 integral with the lower ends of the shoe support plates 57 of the outer shoe 41, and the working face 64 on the rib 63 integral with the underside of the inner shoe 41, respectively, whereby the lined shoes 41, 42 are drawn toward each other into frictional clamping engagement with opposite sides, respectively, of the drum's flange 29 to brake the same and included vehicle wheel to control vehicular speed as is understood.

It is important to note that emergency braking is effected by the lefthand caliper unit $CU^L$ as viewed in FIGS. 1 and 2; however, the other caliper unit $CU^R$ diametrically-positioned opposite the left hand unit may also be utilized for emergency braking by mechanically linking it to the lefthand unit. This is accomplished by incorporating the shaft 88, one-way drive connection DC and the external manual lever ML to have co-rotation with the lefthand unit $CU^L$. The external manual lever ML on the righthand unit $CU^R$ may be shorter than the lever ML on the lefthand unit $CU^L$ requiring a pivotal connection of the interconnecting linkage with the latter lever equal in radial distance to the axis of the shaft 88 as established for the shorter lever as is understood.

Accordingly, it is seen that the invention provides for multicaliper units utilizable in series to achieve emergency braking, or a single caliper unit for the same purpose as shown in FIGS. 1 and 2. Moreover, the disclosed wheel-cylinder WC with two opposing pistons 105 may be utilized in the form of two separate wheel-cylinders with each containing a single reciprocative piston, one to actuate the cam-lever arm 98 of the lefthand reciprocative mechanism RM, and the other piston to actuate the cam-lever arm 98 of the righthand reciprocative mechanism RM as viewed in FIG. 1. Such selective use of the caliper units $CU^{L-R}$ enables "custom-fitting" braking torque requirements to the particular type of motor vehicle including off-highway vehicular equipment, which provides a manufacturing advantage of allowing a wide range of braking torques to be met with a minimum set of parts, i.e., since different braking torque requirements can be met by either changing the diameters of the drum and backing plate, or by changing the width of the drum's flange 29 for a given size drum, or by increasing or decreasing the number of caliper units used on a given size drum.

In the case of using two caliper units, for example, as disclosed herein, both of these units may be employed for service and/or emergency braking, or one of them functioning to provide emergency braking only and both of them operative to provide service braking which produces a flexible design for achieving the desired braking torque from the present drum brake assembly DB producible economically in a relatively simple structural arrangement.

The built-in feature of the cam-levers CL in their respective reciprocative mechanisms RM to effect a push-pull action on the connected brake shoes 41, 42, enables use of one or more caliper units in the rear wheel brake assemblies for both service and emergency braking under pressurized fluid and manual actuation, respectively, and the front wheel brake assemblies DA solely under hydraulic-actuation of the wheel-cylinder WC for service braking only.

As a result of incorporating the emergency brake as a built-in feature of the present invention, the need for conventional shoe-to-drum brakes in combination with separate conventional disc brake assemblies in the rear wheel as currently employed on automotive vehicles, is no longer required because the novel caliper system in the disclosed drum brake DB utilizes the same brake shoes in a novel manner for both service and emergency braking controllable separately or jointly by manual force applied to the pedals BP and PP, respectively, (see FIG. 5).

The present drum brake assembly DA possesses flexibility in design permitting different locations of the wheel-cylinder WC, in that it may be tangentially-oriented with respect to the bearing retainer 12 whether these two components are integrated as shown in FIG. 9 or separate components as shown in FIG. 12, or the wheel-cylinder WC may be spaced above the bearing retainer 12 as shown in FIG. 13 wherein the latter assumes its full annular profile and the wheel-cylinder mounted directly on the backing plate 18 separately from the bearing retainer by means of the two long cap screws 16 inserted through holes 137 in the backing plate into threaded engagement with the tapped holes 103 on the two spaced embossments 104 integral with the underside of the wheel-cylinder housing 102. In the latter location, the bearing retainer 12 would require six short cap screws 15 as shown in FIG. 13 to secure it to the axle housing flange 8.

Inspection and servicing of the axle shaft bearing 11 and working components in the wheel-cylinder WC, may be readily carried out in all three of the above noted installations. For example, in FIG. 9 inspection of the axle shaft bearing 11 would require removing all six cap screws, while the wheel-cylinder could be inspected and serviced as needed without removing the integrated retainer plate 12 and housing 102. In the FIG. 12 installation, the housing 102 and retainer plate 12 would have to be removed for an inspection of the axle shaft bearing 11 as described above for the FIG. 9 installation, while in the FIG. 13 installation, inspection and servicing the wheel-cylinder WC and retainer plate 12 would be carried out as traditionally practiced in commercial shoe-to-drum brake assemblies.

Traditionally the conventional disc brake is characterized by two principal advantages over the conventional shoe-to-drum brake. The first of these is that a large area of the actual braking surface is continuously exposed and cooled by the moving air stream created by vehicle motion and the rotary motion of the associated vehicle wheel itself. This causes a lower surface temperature, thereby providing a cooler interface that keeps the coefficient of friction at a high level. In contrast, heat generated by the conventional shoe-to-drum brake must be transmitted from the braking surface through the drum wall before it can be dissipated to atmosphere. As a result heat tends to build up in the system, thus progressively reducing the available coefficient of friction. This causes the thermal fade effect.

In contrast, the open drum construction of the disclosed novel drum-type brake DB, allows a continuous cooling effect similar to disc brakes due to opposite sides of the drum's flange 29 constituting the braking surfaces.

The second advantage of the conventional disc brake is the light nonbraking contact maintained between the braking surfaces on the disc and the shoe surfaces when the brakes are in released condition. This light slipping contact tends to eliminate moisture and wipe away other materials that might contribute to a frictionreducing effect. This light contact also provides automatic wear adjustments that simplify overall brake structure to reduce servicing requirements. These same benefits are achieved in the present drum-type brake system DB by installing the compression spring 110 between the piston cups 108 of each pair of opposing pistons 105 in each wheel-cylinder WC to maintain the light nonbraking contact for immediate brake applications by taking up slack between the parts comprising the reciprocative mechanism RM and between the working surfaces on the brake linings 43, 44 and opposite sides, respectively, of the drum's flange 29, said spring 110 also serving to maintain the piston cups 108 in engagement with their respective pistons 105 for effective pressure sealing of the former.

A further advantage of the present drum-type brake DB is its ready adaptability to the front- and rear-axle constructions currently employed on automotive vehicles and the like. Moreover, this novel brake system has all the performance and service advantages of the conventional disc brake, with the additional important feature of allowing ready integration of supplemental emergency and parking brake capabilities. Also, this novel brake system has the manufacturing advantage of accommodating a wide range of braking torque requirements to be met with a minimum number of relatively simple parts, such as by changing drum and backing plate diameters, or by using one or more caliper units, or by changing the width of the flange 29 on a given size drum.

When the linings 43, 44 become excessively worn requiring replacement such may be easily made by merely releasing the lining backing strips 45, 46 and then slipping them out of the brake shoes 41, 42 and then inserting the new linings bonded to their respective backing strips, parallel to the axis of the vehicle wheel (drum), such lining replacement being stabilized on their respective brake shoes 41, 42 by the stabilizing pins 54 projecting into the holes 55 and by flanges 49, 51 at opposite ends of the backing strips 45, 46, respectively, best shown in FIG. 6. This simple and inexpensive method of servicing should keep the brake assembly DB at maximum braking efficiency until new linings are again needed, along with automatic adjustment for lining wear under the piston cup spring 110.

Major structural changes are not required to incorporate the present brake assembly DB in front- and rear-axle constructions presently used on motor vehicles and the like, such changes involving the backing plate 18 only because of the specific requirements for a rear wheel brake and a front wheel brake. In the former the backing plate is mounted on the axle-housing flange 8 while the latter would be mounted on the axle spindle flange as is understood In both installations, the caliper units $CU^{L-R}$ would include the novel feature of hydraulic and/or manual actuation. understood.

Further beneficial results in braking control of a motor vehicle equipped with my novel drum brake system DB, may also be realized in the selective use of the caliper units $CU^{L-R}$. For example, the two caliper units shown in FIG. 2 are interchangeable, that is, the caliper unit $CU^L$ may be substituted for the caliper unit $CU^R$ and vice versa, depending on which of these units is to be actuated by the parking brake pedal PP, or these two units may be employed to effect emergency braking by substituting the shaft 88 and one-way drive connection DC and outer lever ML for the support shaft 85 and then mechanically linking the two levers ML so that the two cam-levers CL operate in unison under manual force applied to the parking brake pedal PP via the cable 130 to the manual lever ML as shown in FIG. 14. In this latter arrangement the two caliper units $CU^{L-R}$ would be effective for service and/or emergency braking under operative energization of the wheel-cylinder WC and/or the parking brake pedal PP, respectively.

Accordingly, it is seen that my novel drum brake assembly DB provides effective braking control or motor vehicles and the like with the caliper units $CU^{L-R}$ embodying built-in mechanical safeguards against inadequacy or loss of hydraulic braking power, and that minimal structural changes are required to incorporate the brake assembly DB in hydraulic brake systems used on present-day motorized vehicular equipment. Further, the braking torques for different classes of vehicles may be custom-fitted by the number of caliper units employed on a given diameter backing plate 18 and matching drum 27, or by selective widths of the drum's flange 29 without changing the diameter of the drum 27 and its matching backing plate 18. Also, in multi-caliper installations, all of them may be used for hydraulic service brake operations, and one or a portion of them to effect emergency braking under driver supervision in both cases by manual force applied to the pedals BP or PP as is understood.

In view of the foregoing comprehensive description augmented by the structural disclosure of the drawings, it should be evident that my invention discloses a novel and improved drum brake assembly DB which is simple in design, and effective to efficiently produce reliable braking control for motorized vehicular equipment including off-highway equipment, and which is adapted to achieve its objectives and features first-mentioned in the present specification as well as those which became apparent as the description unfolded.

Whereas, the drawings illustrate and the above description sets forth preferred embodiments of my invention, it is to be understood that the invention contemplates any variations of structure, and equivalents or modifications which may come under the terms of the subjoined claims compatible with the state of the related art.

I claim as my invention:

1. A drum-type brake for motorized vehicular equipment, having a drum provided with a peripheral braking flange defining opposed outer and inner friction faces and corotatable with a vehicle road wheel, a stationary support member mounted on a portion of the vehicle, a caliper unit characterized by radial-operating outer and inner lined brake shoes in circular ring sector profile which straddle-mount the drum's flange to brake the same, wherein the improvement comprises structure defining: reciprocative mechanism including a pair of interfitting members connected to said shoes, respectively, and movable relative to each other to draw said shoes toward each other into frictional braking engagement with the friction faces, respectively, on said drum's flange, a rotatable shaft journaled in said mechanism, a rotatable cam-lever carried on the inner end of said shaft and having operative interposition with respect to confronting working portions on said interfitting members, respectively, to force the latter apart and thereby drawing said shoes into braking engagement as aforesaid, and an elongated arm projecting from said cam-lever; a wheel-cylinder having a piston engageable at one end with the free end of said cam-lever arm to rotate the same in one direction, a variable pressure control chamber continuously communicating with the other end of said piston, a source of pressurized fluid communicable with said control chamber to operatively energize said piston to effect service braking, a normally compressed spring operably disposed in said control chamber to continuously react on said piston to maintain said shoes in nonbraking contact with the friction faces, respectively, on the drum's flange when the brake is in released condition whereby a high level of frictional coefficient is maintained by wiping away materials having a friction-reducing effect, and automatic take up is effected by said spring to compensate for lining wear to prevent delayed braking action; a manually-operated lever journaled on the outer end portion of said shaft exteriorly of said support member; a one-way mechanical drive operably incorporated between the outer end portion of said shaft and manual lever whereby the latter is effective to rotate said shaft in said one direction; and a manual control mechanically-linked to the free end of said manual lever to rotate the same and shaft-connected cam-lever to effect emergency (parking) braking in cooperation with or independently of operative energization of the wheel-cylinder piston to effect service braking.

2. A drum-type brake for motorized vehicular equipment, having a drum provided with a peripheral braking flange defining opposed outer and inner friction faces and corotatable with a vehicle road wheel, a stationary support member mounted on a portion of the vehicle, a pair of caliper units in diametrical opposition, each of said caliper units being characterized by radially-operating outer and inner lined brake shoes in circular ring sector profile which straddle-mount the drum's flange to brake the same, wherein the improvement comprises structure defining: reciprocative mechanism including a pair of slidably-interfitting members characterized by a push-pull action and connected to the shoes, respectively, and movable relatively to each other to draw said shoes toward each other into frictional braking engagement with the friction faces, respectively, on said drum's flange, a rotatable shaft journaled in said mechanism, a double-acting cam-lever co-rotationally carried on the inner end of said shaft, and having operative interposition with respect to spaced confronting working portions on said interfitting members, respectively, to force the latter in opposite directions and thereby drawing said shoes into such braking engagement, and an elongated arm projecting from said cam-lever; a wheel-cylinder having a pair of pistons installed in opposite ends thereof with their outer ends defining working lands engageable with the free ends of the cam-lever arms, respectively, to rotate the latter and connected cam-levers in opposite directions, a variable pressure control chamber between said pistons, a source of pressurized fluid communicable with said control chamber to operatively energize said pistons to move in opposite directions to effect service braking, a normally compressed spring operably disposed in said control chamber to react continuously on each piston in said wheel-cylinder to maintain each pair of shoes in nonbraking contact with the friction faces, respectively, on the drum's flange when the brake is in released condition whereby a high level of frictional coefficient is maintained by wiping away materials having a friction-reducing effect, and automatic take up by the spring compensates for lining wear to prevent delayed braking action; a manually-operated lever journaled on the outer end portion of one of said shafts exteriorly of said support member; a one-way mechanical drive operably incorporated between the outer end portion of the one shaft and said manual lever whereby the latter is effective to rotate the one shaft in one direction; and a manual control mechanically-linked to the free end of said manual lever to rotate the same and shaft-connected cam-lever to effect emergency (parking) braking in cooperation with or independently of operative energization of the wheel-cylinder pistons to effect service braking.

3. The brake as claimed in claim 2 in which the outer brake shoe is provided with a detachable similarly-profiled friction lining with opposite ends of the shoe angulated, including a plurality of holes through the body of the shoe, a metallic backing strip bonded to said lining and provided with a matching pattern of upstanding pins which project into said holes, and opposite ends of said strip define upturned flanges adapted to engage the angulated ends of the shoe whereby said pins and flanges cooperate to stabilize the strip backed lining on the brake shoe.

4. The brake as claimed in claim 3 in which the inner brake shoe is provided with a detachable similarly-profiled friction lining with opposite ends of the shoe angulated, including a plurality of holes through the body of the shoe, a metallic backing strip bonded to said lining and provided with a matching pattern of upstanding pins which project into said holes, and opposite ends of said strip define downturned flanges adapted to engage the angulated ends of the latter shoe whereby said pins and flanges cooperate to stabilize the strip backed lining on the latter brake shoe.

5. The brake as claimed in claim 2 in which the reciprocative mechanism additionally includes structure defining a base member contiguous to the support member and a laterally extending integral boss, a cover member having a laterally extending integral boss projecting oppositely to the boss on the base member, a bore coextensive with the cover member and its boss and extending in coaxial relation through the base member and a portion of the boss integral with the latter, a channel in said cover member defining a track in rectangular cross section in assembled relation with the base member, said track being adapted to receive said pair of interfitting members to slidably support them, a downturned lateral flange coextensive with one edge of the outer brake shoe, means connecting the upper ends of said pair of interfitting members with the outer shoe flange directly and with the inner shoe, respectively, a tangentially-oriented flange integral with the central underside of the inner brake shoe, the outer face of which defines the corresponding working portion aforesaid, a horizontal flange integrally projecting from the lower end of the pair of interfitting members connected to the outer brake shoe, an offset horizontal flange integrally terminating the first-defined horizontal flange, the upper face of the offset flange defines the corresponding working portion aforesaid in confronting relation to the working face on the tangential flange, said cam-lever having operative interposition with respect to said working faces to act thereon to separate them and thereby slidably moving the pair of interfitting members relatively to each other and the connected brake shoes toward each other into frictional braking engagement with the drum's flange to apply the brake; a pair of aligned projecting ears integrally projects from opposite ends, respectively of said base and cover members, a pair of aligned holes through said ears, a pair of headed bolts passes through said holes, and nuts threaded onto the threaded portions of said bolts passing through holes in the support member aforesaid, secure the cover and base members as a unitary assembly fast on said support member.

6. The brake as claimed in claim 5 in which the said reciprocative mechanism which includes said one-way mechanical drive comprises an outstanding angular arm integral with said manual lever, a short lever corresponding in length to said arm, fast on the hub of the last-mentioned drive, and a link pivotally interconnecting the free end of said arm with the free end of the short lever whereby rotation of the manual lever in one direction correspondingly rotates the short lever in the opposite direction to simultaneously actuate the pair of brake shoes in each caliper unit to effect emergency (parking) braking in cooperation with or independently of wheel-cylinder actuation of said pairs of brake shoes.

7. The brake as claimed in claim 5 in which the one-way mechanical drive comprises structure defining a counterbore in the base member boss, and annular shoulder between said counterbore and coaxially-related shaft bore aforesaid, an annular driven disc contiguous to said shoulder and splined on the outer portion of said shaft for co-rotation, a pair of diametrically-opposed laterally-projecting lugs on said driven disc, an annular hub journaled in said counterbore with one end fast on one end of said manual lever and the other end formed with a pair of diametrically-opposed slots to receive said lugs, respectively, a working face at one end of each slot adapted to engage the confronting side of said lugs, respectively, to impart one-way rotation to said shaft, the width of said slots being sufficient to accommodate idle rotation of said shaft and connected driven disc under operative energization of said wheel-cylinder to effect service braking, said manual lever being effective to rotate said shaft via said slot-and-lug connection in engagement to effect emergency (parking) braking in cooperation with or independently of service braking effected by the operatively energized wheel-cylinder.

8. The brake as claimed in claim 7 in which the support member aforesaid is a backing plate, including a second support member having a circular recess for reception of an axle-shaft support bearing, a retaining plate for the bearing integrated with the housing for the wheel-cylinder aforesaid and mounted on said second support member with the central portion of the backing plate therebetween, and a plurality of threaded fasteners projecting through a like-number of holes circumferentially-spaced in the margin of the integrated retaining plate and wheel-cylinder housing, and in the backing plate into a like-number of tapped holes in the second support member to retain the bearing and mount the wheel-cylinder in operating position.

9. The brake as claimed in claim 8 in which the bearing retaining plate and the wheel-cylinder housing are separate components, with a portion of the latter serving to complete the bearing retaining function of the retaining plate.

10. The brake as claimed in claim 8 in which the plurality of fasteners is utilized to mount the bearing retaining plate separately from the wheel-cylinder housing mounted directly on the backing plate, including a plurality of holes in the latter in alignment with a like-number of tapped holes in the wheel-cylinder housing, and a like-number of threaded fasteners pass through the last-defined plurality of holes into threaded engagement with the last-defined tapped holes to mount the wheel-cylinder in operating position on the backing plate.

11. A caliper unit for use with a drum-type brake characterized by a cup-shaped drum rotatable about an axis and having a peripheral braking flange co-rotatable with a member to be braked, a stationary support member, radially-oriented outer and inner brake shoes in circular ring sector profile fitted with detachable linings of similar profile, said shoes being adapted to straddle-mount said braking flange to frictionally brake the drum, wherein the improvement comprises structure defining: reciprocative mechanism having a housing defining a channel radially-oriented with respect to the axis aforesaid, fastening means for detachably mounting said housing on the support member, a pair of interfitting members slidably-disposed in said channel and extending from said shoes, respectively, said members being characterized by relative push-pull action, a pair of spaced working surfaces in confronting relationship on said members, respectively, a force - transmitting shaft journaled on said housing, and a double-acting cam-lever fast on one end of said shaft and having operative interposition with respect to said working surfaces to separate them whereby the shoes are simultaneously drawn toward each other into frictional engagement with said braking flange to brake the drum; a manual input lever; energizable operating means for rotating said shaft in one direction; a one-way mechanical drive operably incorporated between the other end of said shaft and the manual lever enabling the latter to rotate said shaft in the one direction to apply the brake shoes to said braking flange independently of, or in cooperation with said operating means under energization; and energizing means for said operating means.

12. A brake for use on motorized vehicular equipment, and having a drum rotatable about an axis and characterized by a peripheral braking flange defining inner and outer opposed friction faces, a stationary support member, and a pair of caliper units, each having radially-oriented inner and outer brake shoes fitted with detachable linings in circular ring sector profile and adapted to straddle-mount the braking flange to brake the drum, wherein the improvement comprises structure defining : reciprocative mechanism having a pair of juxtaposed plates defining a radial channel therebetween and detachably mounted on said support member, a pair of interfitting members characterized by push-pull action projecting from said shoes, respectively, a pair of confronting working surfaces in spaced relation on said members, respectively, and slidably supported in said channel, a force-input shaft journaled transversely on said plates, a double-acting cam-lever fast on said shaft, and having operatively interposition with respect to said working surfaces to act thereon whereby rotation of the cam-lever in one direction is effective to separate said working surfaces and corresponding members to draw said shoes toward each other into frictional braking engagement with the friction faces on the braking flange to effect service braking of the drum; energizable operating means for rotating said shaft and connected cam-lever in the one direction, a source of energy for energizing said operating means; a normally compressed spring associated with said operating means and adapted to apply said shoes in non-braking contact with said braking flange when the latter is released, to take up slack resulting from lining wear and to wipe away materials having a friction-reducing effect; a manual input lever operably associated with said shaft; a one-way mechanical drive between said shaft and the manual lever for rotating the cam-lever in the one direction to manually-apply the brake shoes to the braking flange to brake the drum independently of or in cooperation with the operating means when energized.

* * * * *